United States Patent
Abeywardena et al.

(10) Patent No.: US 10,685,229 B2
(45) Date of Patent: Jun. 16, 2020

(54) IMAGE BASED LOCALIZATION FOR UNMANNED AERIAL VEHICLES, AND ASSOCIATED SYSTEMS AND METHODS

(71) Applicant: Wing Aviation LLC, Mountain View, CA (US)

(72) Inventors: Dinuka Abeywardena, Mountain View, CA (US); Damien Jourdan, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 143 days.

(21) Appl. No.: 15/963,027

(22) Filed: Apr. 25, 2018

(65) Prior Publication Data

US 2019/0197292 A1 Jun. 27, 2019

Related U.S. Application Data

(60) Provisional application No. 62/609,135, filed on Dec. 21, 2017.

(51) Int. Cl.
*G06K 9/00* (2006.01)
*G06K 9/62* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC .... G06K 9/0063; G06K 9/6203; G05D 1/101; G08G 5/0013; G08G 5/0069; G08G 5/0086; G08G 5/0039; G06T 7/74; G06T 2207/10032; G06T 2207/30244; B64C 39/024; B64C 2201/104; B64C 2201/108; B64D 47/08; G01C 21/00; G01C 21/20; H04N 5/33; H04N 7/181
See application file for complete search history.

(56) References Cited

U.S. PATENT DOCUMENTS 5,208,757 A 5/1993 Appriou et al.
7,191,056 B2 3/2007 Costello et al.
(Continued)

OTHER PUBLICATIONS

Saranya et al. "Application of Vision Based techniques for UAV Position Estimation." International Conference on Research Advances in Integrated Navigation Systems (RAINS), May 6, 2016, 5 pages (Year: 2016).*

(Continued)

*Primary Examiner* — Jon Chang
(74) *Attorney, Agent, or Firm* — Christensen O'Connor Johnson Kindness PLLC

(57) ABSTRACT

Systems and methods for image based localization for unmanned aerial vehicles (UAVs) are disclosed. In one embodiment, a method for navigating a UAV includes: flying a UAV along a flight path; acquiring an image of a ground area along the flight path with a camera carried by the UAV; and sending the image to a base station. The method further includes receiving navigation data from the base station, based upon a comparison of the image of the ground area to at least one terrestrial map of the flight path.

20 Claims, 9 Drawing Sheets

(51) Int. Cl.
  G01C 21/00 (2006.01)
  G08G 5/00 (2006.01)
  B64D 47/08 (2006.01)
  B64C 39/02 (2006.01)
  G06T 7/73 (2017.01)
  G05D 1/10 (2006.01)
  G01C 21/20 (2006.01)
  H04N 7/18 (2006.01)
  H04N 5/33 (2006.01)

(52) U.S. Cl.
  CPC ............ *G01C 21/00* (2013.01); *G05D 1/101* (2013.01); *G06K 9/6203* (2013.01); *G06T 7/74* (2017.01); *G08G 5/0013* (2013.01); *G08G 5/0039* (2013.01); *G08G 5/0069* (2013.01); *G08G 5/0086* (2013.01); *H04N 5/33* (2013.01); *H04N 7/181* (2013.01); *B64C 2201/104* (2013.01); *B64C 2201/108* (2013.01); *G01C 21/20* (2013.01); *G06T 2207/10032* (2013.01); *G06T 2207/30244* (2013.01)

(56) References Cited

U.S. PATENT DOCUMENTS

| | | |
|---|---|---|
| 8,515,611 B2 | 8/2013 | Tener et al. |
| 8,666,661 B2 | 3/2014 | Higgins |
| 9,387,928 B1 | 7/2016 | Gentry et al. |
| 2007/0269102 A1* | 11/2007 | Wang ............... G01C 11/00 382/154 |
| 2014/0312165 A1* | 10/2014 | Mkrtchyan ........... B64D 47/08 244/13 |
| 2014/0316616 A1* | 10/2014 | Kugelmass ............ G05D 1/101 701/8 |
| 2016/0107749 A1* | 4/2016 | Mucci .................. B64C 39/024 701/3 |
| 2017/0328716 A1* | 11/2017 | Ma ....................... G01C 21/165 |
| 2018/0274720 A1* | 9/2018 | Gubler ................ H04N 5/2253 |
| 2019/0004543 A1* | 1/2019 | Kennedy ........... H04N 5/23296 |
| 2019/0047706 A1* | 2/2019 | Schwarzbach ....... B64C 39/024 |

OTHER PUBLICATIONS

International Search Report and Written Opinion from the International Searching Authority dated Apr. 9, 2019 for International Application No. PCT/US2018/065563, filed Dec. 13, 2018, 14 pages.

Li-Chee-Ming, "Map-Based Localizaton for Unmanned Aerial Vehicle Navigation," A Dissertation submitted to the Faculty of Graduate Studies in partial fulfillment of the requirements for the degree of Doctor of Philosophy Graduate Program in Earth and Space Science, York University, Jul. 2017, 206 pages.

Middelberg, S., et al. "Scalable 6-DOF Localization on Mobile Devices," pre-print of paper accepted for publication in: Fleet D., Pajdla T., Schiele B., Tuytelaars T. (eds) Computer Vision—ECCV 2014. ECCV 2014. Lecture Notes in Computer Science, vol. 8690. Springer, Cham, Jan. 2014.

* cited by examiner

IMAGE BASED LOCALIZATION FOR UNMANNED AERIAL VEHICLES, AND ASSOCIATED SYSTEMS AND METHODS

CROSS-REFERENCE(S) TO RELATED APPLICATION(S)

This application claims the benefit of U.S. Provisional Patent Application No. 62/609,135, filed Dec. 21, 2017, the entirety of which is incorporated herein by reference.

BACKGROUND

An unmanned aerial vehicle (UAV), which may also be referred to as an autonomous vehicle, is a vehicle capable of travel without a physically-present human operator on board. A UAV may operate in a remote-control mode, in an autonomous mode, or in a partially autonomous mode.

When a UAV operates in a remote-control mode, a pilot or driver that is at a remote location can control the UAV by commands that are sent to the UAV via a wireless link. When the UAV operates in autonomous mode, the UAV typically moves based on pre-programmed navigation waypoints, dynamic automation systems, or a combination of these. Further, some UAVs can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Position and orientation of the UAV should be known for a variety of reasons, for example, for maintaining the required flight path of the UAV, for avoidance of obstructions, avoidance of the flight path of the commercial aircraft, precise delivery of the payload, precise coverage of certain ground area when the UAV is used in telecommunication, etc. In practice, unmanned aerial vehicles (UAVs) typically carry a global positioning system (GPS)-based primary navigation system onboard to determine the UAV's location. For various reasons, however, the GPS-based navigation system may fail, rendering the UAV inoperable. For example, the GPS signal may be erroneous or too weak to be used by the UAV. Furthermore, the GPS equipment of the UAV may also fail, thus making the UAV, at a minimum, incapable of fulfilling its tasks, but possibly also dangerous to other air vehicles.

Accordingly, there remains a need for the systems and methods that precisely determine the location of the UAVs even when GPS signal is weak or erroneous, or when the GPS system of the UAV fails.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
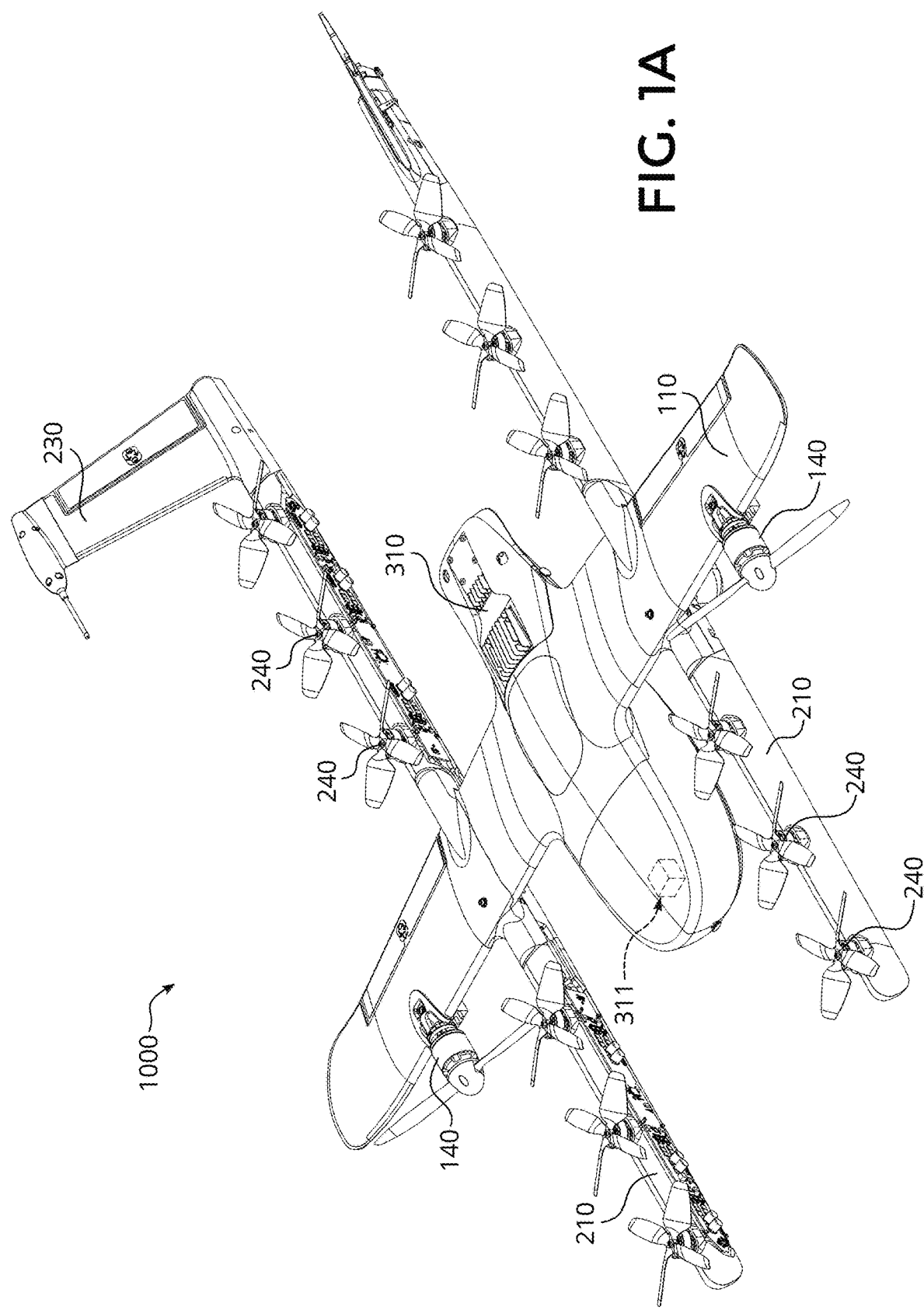
FIG. 1A is a top isometric view of a UAV in accordance with an embodiment of the present technology.

While illustrative embodiments have been described, it will be appreciated that various changes can be made therein without departing from the spirit and scope of the inventive technology. Embodiments of the inventive technology are generally applicable to the UAVs and manned aerial vehicles. In some embodiments, the inventive technology may support UAV traffic management (UTM). For example, for an UTM system to function properly, the location of all UAVs sharing the airspace should be known accurately. Using GPS as the sole navigation system creates a single point of failure for a UTM system. Therefore, the image based navigation service described below can alleviate the single point of failure issues.

The conventional UAVs typically use GPS-based primary navigation systems to determine the location of the UAV. The inventive technology is directed to determining the location of the UAV even when the GPS signal is erroneous or weak by using a camera-based navigation system. Such a camera-based navigation system may be referred to as a backup or a secondary navigation system. The camera-based navigation system may be provided as a service to the UAV or other aerial vehicle. For brevity and conciseness, the inventive technology is described with reference to the UAVs, but the technology is also applicable to manned aerial vehicles.

In some embodiments, the UAV carries a camera that captures images of the area under the UAV. In some embodiments, the camera is mounted on a pivot mechanism that can adjust the angle of the camera. For example, the pivot mechanism may keep the camera oriented vertically with respect to the ground for consistency of the images.

The captured images are transmitted to ground equipment for further processing. For example, a cell phone tower may receive the images, and forward the images to a base station that includes computers and/or servers capable of relatively fast processing of the images and terrestrial maps (e.g., under 1 second, under 2 seconds, etc.).

In some embodiments the base station includes a database with maps. The maps may differ from each other spatially, temporarily or in other forms. For example, the base station may have different maps covering different geographical areas. As another example, the base station may have maps covering the same geographical area, but built using imagery captured at different time of day. In yet another example, the base station may have maps covering the same geographical area, but built using imagery captured during different seasons. Furthermore, different maps may have been prepared from imagery captured with different light spectra.

In some embodiments, the base station, upon receiving an image from the UAV, attempts to find, among its data base of maps, one or more maps that are likely to be similar to the image. This process of map selection may be helped by additional data associated with the image sent by the UAV (e.g., the rough location of the UAV, time of day, spectral characteristics of the UAV camera, etc.). Once these maps are identified, the base station may execute one or more algorithms to register the image sent by the UAV to the maps. In this registration process, the base station derives the location and orientation of the UAV with respect to the known X, Y, Z coordinates of the map. An example of such image registration algorithm is described with reference to FIG. 5 below. Other image registration algorithms are known to those skilled in the art. In some embodiments the location and orientation derived at the base station is transmitted back to the UAV and the UAV may use this information to achieve its goals.

In some other embodiments the base station may not send any information back to the UAV, but, instead, the base station forwards the calculated location and orientation information to a third party. One such example of a third party is a UTM system. In another embodiment, if the images are tagged with what the UAV considers to be the location and/or orientation of the UAV when the images were taken, then the base station may compare that determination made by the UAV to the location and/or orientation derived at the base station. The base station may send the resulting estimate of the accuracy of the UAV-originated location orientation information to the UAV itself or to a third party such as a UTM system. In some embodiments, the UTM system may use this information to make decisions about the UAV.

In some embodiments, the images acquired by the camera may be filtered at the UAV to make the files smaller and/or more pertinent for the subsequent processing at the base station. For example, un-movable and/or easily recognizable object (e.g., road intersections) may be kept in the image, while the movable or changeable object (e.g., cars, trees) may be removed from the image prior to forwarding the image to the receiver (e.g., cell phone tower) to improve a likelihood of the match between the image and the terrestrial map.

In some embodiments, the ground-based maps can be updated based on the images acquired by the camera on the UAV. For example, the maps may be refreshed by replacing outdated segments of the map (also referred to as the "sections" or "tiles") with more recent images received from the UAV.

FIG. 1A is a top isometric view of a UAV 1000 in accordance with an embodiment of the present technology. The UAV 1000 includes a wing 110, booms 210, and a fuselage 310. In some embodiments, the wing 110 carries horizontal propulsion units 140, and the booms 210 carry vertical propulsion units 240. In some embodiments, the booms 210 terminate in rudders 230 for improved yaw control of the UAV 1000.

In operation, power for the propulsion units may be provided from a battery compartment of the fuselage 310. In some embodiments, the fuselage 310 also includes an avionics compartment and a delivery unit for handling the payload. In some embodiments, the fuselage 310 carries a GPS system 311. However, at certain locations the GPS system 311 may produce inaccurate results, or the incoming GPS signal may be too weak or too contaminated for accurate determination of the position of the UAV.

Figure 1B:
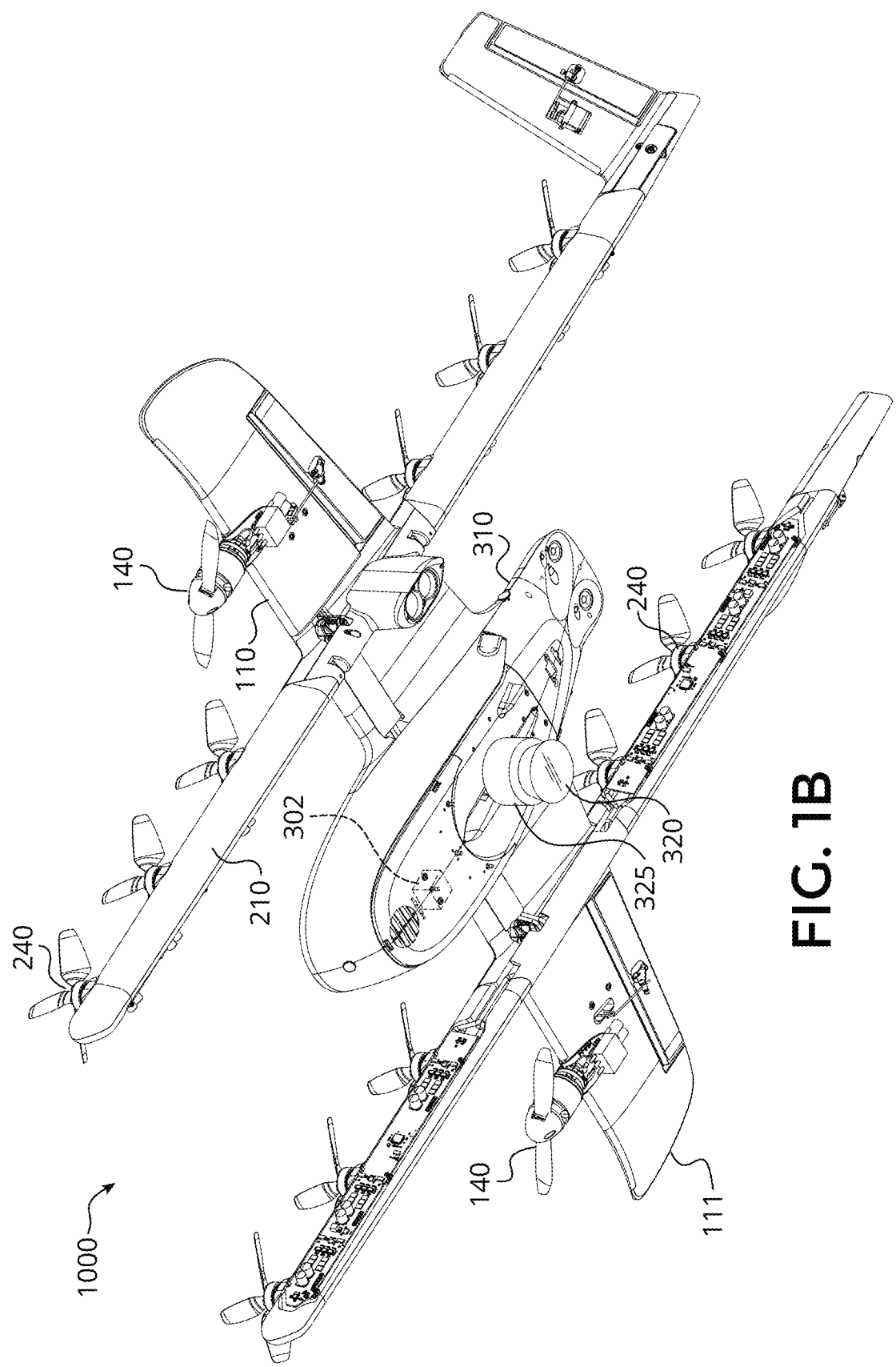
FIG. 1B is a bottom isometric view of a UAV in accordance with an embodiment of the present technology.

FIG. 1B is a bottom isometric view of the UAV 1000 in accordance with an embodiment of the present technology. In some embodiments, the UAV 1000 carries a camera 320 that is directed toward the ground. The camera 320 may be a digital camera that operates within the visible spectrum of light. In other embodiments, the camera 320 may operate within the infrared spectrum when, for example, operating during the night or within the ultraviolet spectrum when, for example, operating in cloudy weather. In some embodiments, the UAV 1000 may include multiple cameras 320 configured to operate within different spectra.

In some embodiments, the camera 320 is carried by a pivot mechanism 325. In operation, the pivot mechanism may adjust the angle of the camera 320 based on the input from an inertial measurement unit (IMU) 302, for example, an accelerometer-based IMU that determines an absolute orientation of the UAV 1000 with respect to the direction of the gravity force. In response to the input from the IMU 302, the pivot mechanism 325 may orient the camera vertically to the ground to provide common reference angle for the images acquired by the camera. In other embodiments, the pivot mechanism 325 may orient the camera 320 at other angles.

Figure 2:
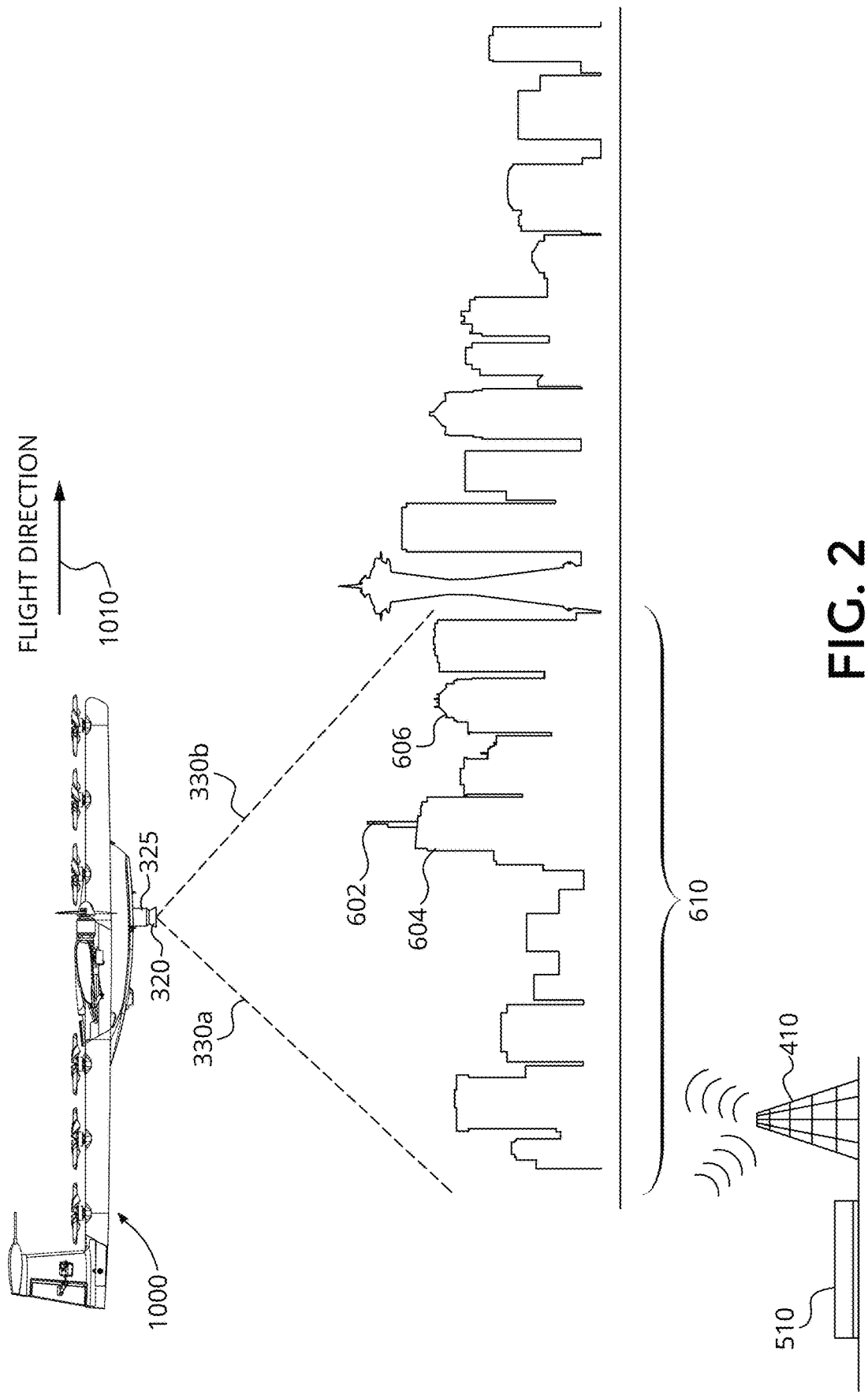
FIG. 2 is a schematic view of the UAV in operation in accordance with an embodiment of the present technology.

FIG. 2 is a schematic view of the UAV 1000 in operation in accordance with an embodiment of the present technology. In some embodiments, the UAV 1000 acquires images by the camera 320 while flying in a direction 1010 (also referred to as flight direction or flight path) at an altitude of about 30-150 m above the ground. During the flight, an image of the ground area 610 may be acquired using a 640×480, 1280×800, or other pixel resolution of the camera. The illustrated sample acquired image includes characteristic points of the objects 602 (a spire), 604 (outline of a building), 606 (roof of a building), etc. In some embodiments, the UAV 1000 carries multiple cameras. In many embodiments, the X, Y, Z coordinates of the characteristic points 602, 604, 606 are known, and may be included as auxiliary data in the terrestrial maps.

As the UAV 1000 flies in a direction 1010, additional images may be acquired and sent to a transceiver 410 (e.g., a cell phone tower). The transceiver 410 may forward the images to a base station 510. In some embodiments, the base station 510 includes computers and/or servers capable of relatively rapidly processing the images acquired by the camera 320. Sample processing of the images acquired by the camera 320 is described with reference to FIGS. 3A-4 below.

Figure 3B:
FIGS. 3A and 3B are images taken by the UAV camera in accordance with an embodiment of the present technology.
Figure 3A:

FIGS. 3A and 3B are images 610 and 620 taken by the UAV camera 320 in accordance with an embodiment of the present technology. The sample images 610/620 may have been acquired at different times as the UAV 1000 flies along its route. In some embodiment, the acquisition of the images may be triggered when a GPS signal appears relatively weak or contaminated to the GPS system 311. In other embodiments, the camera 320 may acquire images at, for example, prescribed time intervals. The acquired images may be tagged (e.g., using unique alpha-numerical, timestamps, or other information), and forwarded to the transceiver 410.

In some embodiments, the images 610 and/or 620 may be pre-processed before being transmitted to the transceiver 410. For example, the sub-images belonging to movable objects (e.g., cars 612) may be removed. As another example, an outline of the immovable object may be identified and outlined (e.g., road cross-sections, a house outline 622, etc.). Furthermore, the UAV and/or the base station may be receiving identification information from one or more transceivers 410 (e.g., cell phone towers). This transceiver-identification may be used in conjunction with the tagged images to, for example, narrow down the population of the maps that the base station 510 relies on. In operation, the pre-processing of the images 610 and 620 is generally proportional with the processing capability of the UAV-based computers/controllers. In many embodiments, to achieve a relatively fast determination of the location and/or orientation of the UAV 1000 (e.g., about 1 second to determine the location/orientation of the UAV), most of the image processing takes place at the base station 510. The UAV may adjust its flight course based at least in part upon UAV location data or UAV orientation data (also referred to as "navigation data"). Sample processing of the images 611/612 acquired by the camera 320 is described with reference to FIG. 4 below.

Figure 4:
FIG. 4 shows an overlay of the images of FIGS. 4A and 4B over a map in accordance with an embodiment of the present technology.

FIG. 4 shows an overlay of the images 610 and 620 of FIGS. 3A and 3B over a terrestrial map 600 in accordance with an embodiment of the present technology. The base station 510 attempts to match the images with one or more of the maps stored in its database. These maps may vary from each other spatially, temporarily or in other forms. In an embodiment, the base station may have different maps covering different geographical areas. In another embodiment, the base station may have maps covering the same geographical area but built using imagery captured at different time of day. In yet another embodiment, the base station may have maps covering the same geographical area but built using imagery captured during different seasons. In an embodiment, different maps may have been based on imagery captured from different light spectra.

In some embodiments, the base station may start with finding, among the collection of maps, the maps that are most likely to match the imagery received from the UAV. The base station may use the auxiliary information associated with the images received from the UAV to aid this process. The base station 510 can then run image matching software to derive the location and orientation of the UAV when the images 610 and 620 were captured. Various image matching algorithms are known to a person of ordinary skill, for example, cross-correlation based or feature-based, spatial or frequency recognition, and other algorithms.

In some embodiments, the existing maps available to the base station 510 may be updated based on the images received from the UAVs. For example, when multiple images repeatedly show a layout of the structures on the ground that is different from that shown in the map, the base station 510 may update the map to reflect the more recent information obtained by the camera(s) on the UAVs. Furthermore, changes in the seasons may affect foliage and shadow angles, which may be cataloged based upon the images received from the UAV to improve future image registration. Other changes to buildings or otherwise may also be identified in the images received from the UAV for the updates of the terrestrial maps.

Figure 5:
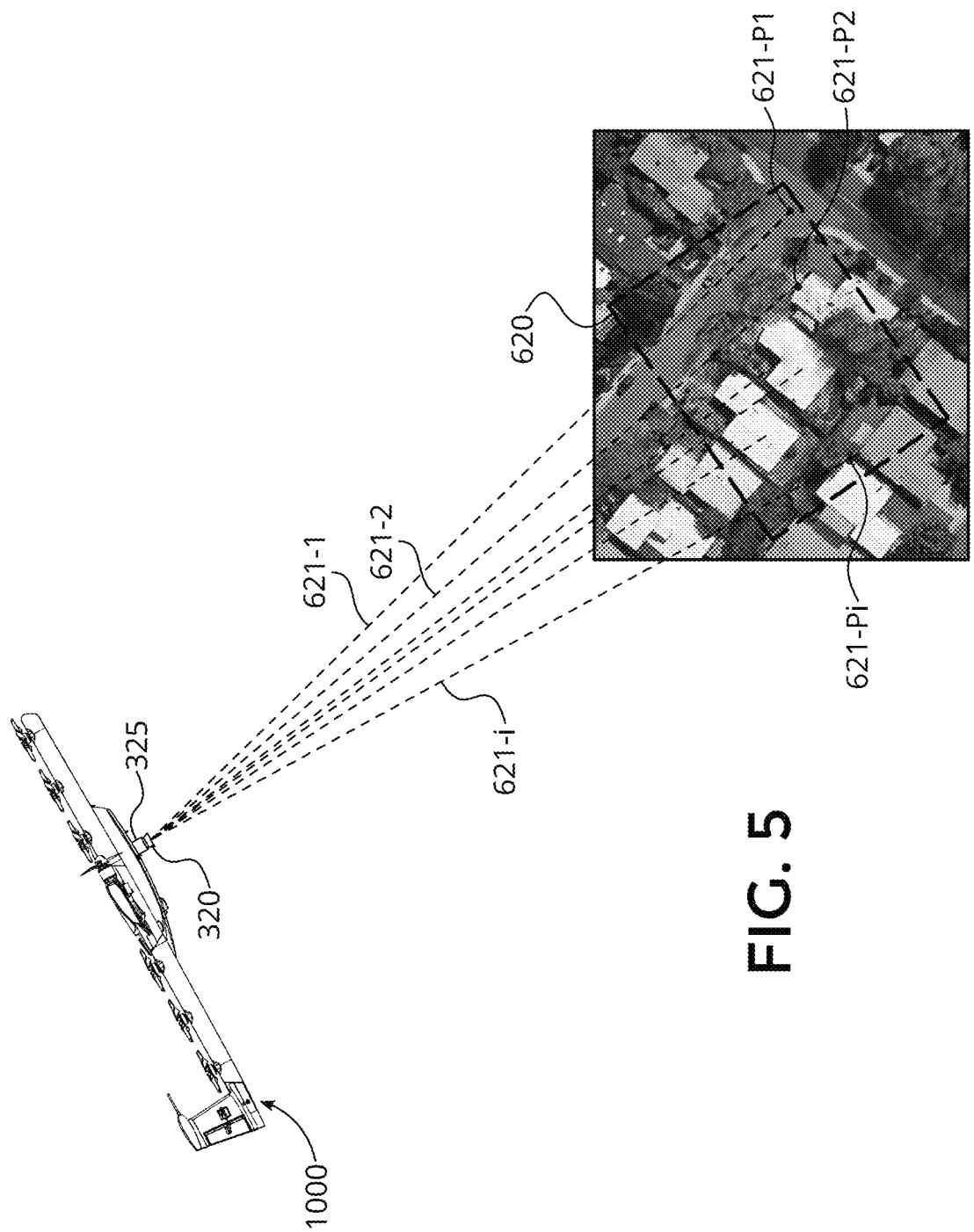
FIG. 5 is a schematic view of determining location and orientation of the UAV in accordance with an embodiment of the present technology.

FIG. 5 is a schematic view of determining location and orientation of the UAV in accordance with an embodiment of the present technology. With the illustrated embodiment, the location and/or orientation of the camera of the UAV is determined based on the image (tile) 620. In some embodiments, the location and orientation of the UAV is determined using a feature based method as follows. After the image 620 is received by the base station, the base station finds the map or maps that are mostly likely to match with the image 620. The base station then identifies points of interest in both the image 620 and the map(s) selected in the previous step. In one embodiment, these points of interests could be lines visible in the image 620 and maps(s). In another embodiment, these points of interest could be prominent geographical or man made landmarks visible in the image. The base station then extracts pixel based descriptors for these points of interest. Some example descriptors are SIFT, SURF, FAST, etc. The base station then matches these descriptors for the points of interest from the map(s) with the descriptors for the points of interest from the image 620. Some example matching techniques are brute-force matching and nearest-neighbor based matching. The output of the matching process is a set of correspondences between the map(s) and image 620. Each correspondence may assign a pixel point from the map(s) to their corresponding pixel point on image 620. Since pixel points on the map(s) are associated with X,Y,Z coordinates (or other coordinates in other coordinate systems, e.g., in a polar or a spherical coordinate system), the X,Y,Z coordinates of the corresponding pixel points on the image 620 are also known. With several of such correspondences, the location and orientation the UAV when the image was captured can be established using triangulation or other optimization methods.

In theory, at least four non-colinear pixels are required to determine the six degrees of freedom for the camera without ambiguity (three degrees of freedom for the location and three degrees of freedom for the angle of the camera). However, in many practical situations, a larger number of pixels are used in the calculation, for example, 10 or more pixels. Additionally, the UAV may transmit parameters of the camera (e.g., focal depth, aperture, field of view, etc., —collectively, the "intrinsics of the camera") to the base station for improved determination of the location and orientation of the camera.

A person of ordinary skill would know multiple algorithms that can determine the location and the orientation of the camera. An example of such algorithm is a feature based method described above. In some embodiments, the required computer calculations may be done at least in part by the UAV itself. In some embodiments, only the final calculated location and orientation of the UAV is sent back to the UAV from the base station. In some other embodiments, additional information may be sent back to the UAV. For example, if the images are tagged with what the UAV provisionally determines to be the location and/or orientation of the UAV when the images were taken, then the base station may compare that provisional determination to the UAV location and/or orientation derived at the base station. The base station may decide to send back to the UAV an indication of how accurate the UAV-originated location and/or orientation is. In other embodiments, the base station may send information from the intermediate steps of the image registration algorithm back to the UAV, before the final determination of the UAV location and orientation by the base station. In some embodiments, the intermediate information may include the correspondences established between the map and the UAV image. Such intermediate information may be used by the UAV in combination with other measurements obtained from its on-board sensors to derive a more up-to-date estimate of the location and orientation of the UAV.

Once the location and orientation of the camera is known, the location and the orientation of the UAV can be determined based on the parameters of the pivot mechanism. In some embodiments, computing devices at the base station may be used for rapid determination of the location and orientation of the camera. In other embodiments, the location and orientation of the camera may be at least partially determined by the computing devices carried by the UAV itself.

If the computations are completed within relatively short period of time (e.g., within about 1 second), the present location of the UAV may be relatively precisely determined based on the velocity vector of the UAV and the time that elapsed from the time of the image acquisition by the UAV to the time of receiving the camera location by the UAV. In some embodiments, for example when it takes longer than 5-10 seconds to identify the matching location on the map, a determination of the location of the UAV at the present time may be improved by relying in part on a sequence of images acquired by the camera since the original image that was sent to the base station was captured. For example, the first image in the sequence may include several characteristic points (e.g., characteristic points 602, 604, 606, shown in FIG. 2). By the time the base station transmits the location and the orientation of the camera back to the UAV, the latest image acquired by the UAV may include a subset of the characteristic points that still remain in the field of view of the camera, but are now associated with different pixels of the more recent images. Therefore, in some embodiments, the UAV may determine its updated location by comparing the image pixels corresponding to the characteristic points on an earlier image, and the image pixels that represent the remaining characteristic points in the more recent image.

Figure 6A:
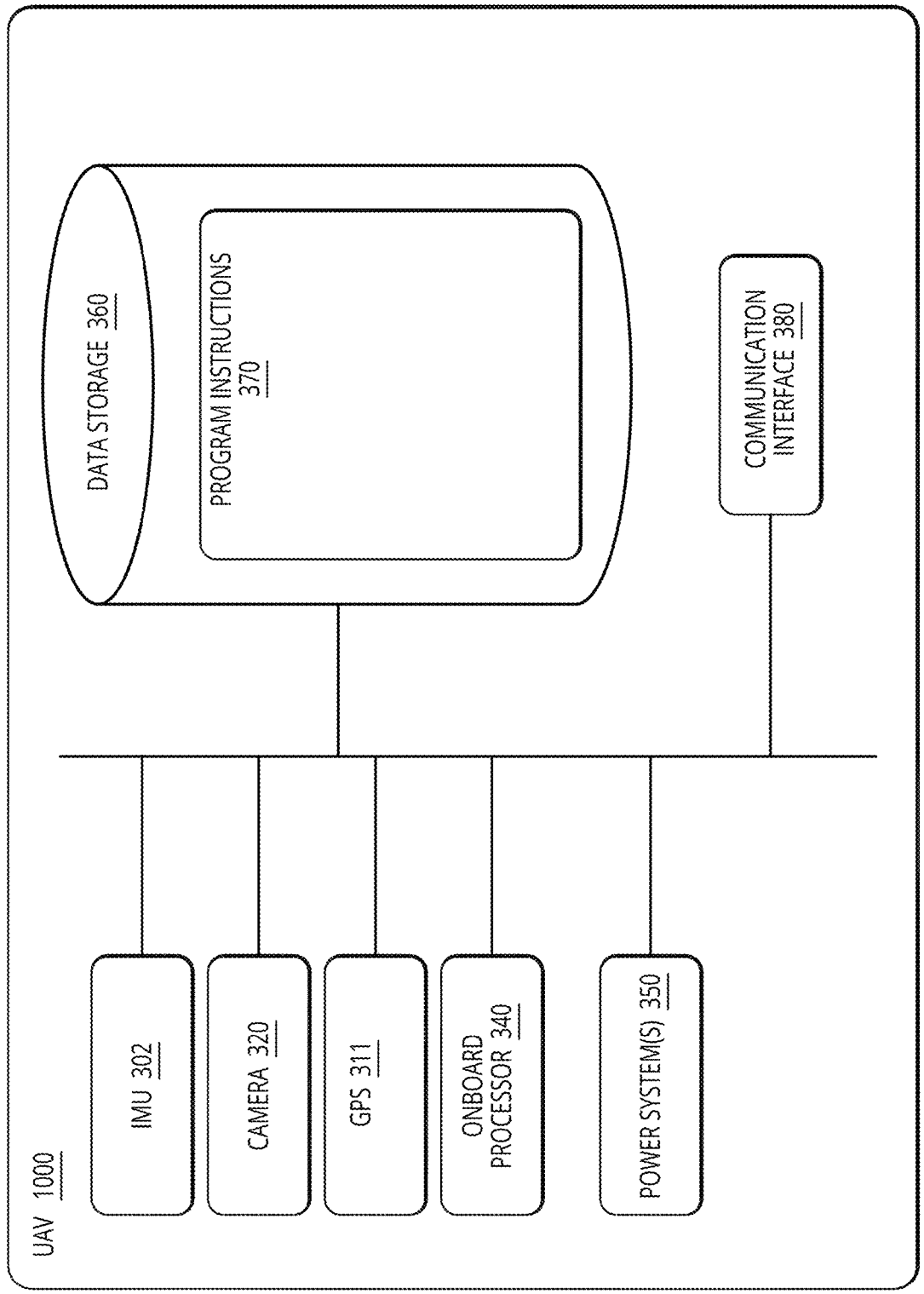
FIG. 6A is a schematic view of a navigation system of the UAV in accordance with an embodiment of the present technology.

FIG. 6A is a schematic view of a navigation system of the UAV in accordance with an embodiment of the present technology. In some embodiments, the IMU 302 may include an accelerometer and/or a gyroscope for determining the orientation of the UAV 1000. In particular, the accelerometer can measure the acceleration of the UAV with respect to earth, while the gyroscope can measure the rate of rotation around an axis. For instance, an IMU 302 may be a miniaturized MicroElectroMechanical System (MEMS) or a NanoElectroMechanical System (NEMS). Other types of IMUs may also be utilized. The IMU 302 may include other sensors, for example magnetometers for determining a compass orientation of the UAV. In some embodiments, the IMU 302 includes pressure sensors for measuring a barometric pressure at the UAV that, in turn, at least partially determines the altitude of the UAV.

The UAV 1000 may include the GPS 311. The navigation of the UAV 1000 may depend on the GPS 311 when the GPS signal is relatively strong and uncontaminated.

In some embodiments, the UAV 1000 includes one or more processors or controllers 340 that may be general-purpose processors or special purpose processors (e.g., digital signal processors (DSPs), application specific integrated circuits (ASICs), etc.). The processors 340 may execute computer-readable program instructions 370 that are stored in data storage 360 and are executable to provide the functionality of a UAV described herein. The data storage 360 may include one or more computer-readable storage media that can be read or accessed by at least one processor 340. The computer-readable storage media may include volatile and/or non-volatile storage components, such as optical, magnetic, organic or other memory or disc storage, which can be integrated in whole or in part with at least one of the one or more processors 340.

The UAV 1000 may include a communication interface 380 (e.g., a wireless transceiver) for communicating with the ground based receiver/transmitter (transceiver) 410. The above-described navigation system of the UAV 1000 may be powered by a power system 350.

Figure 6B:
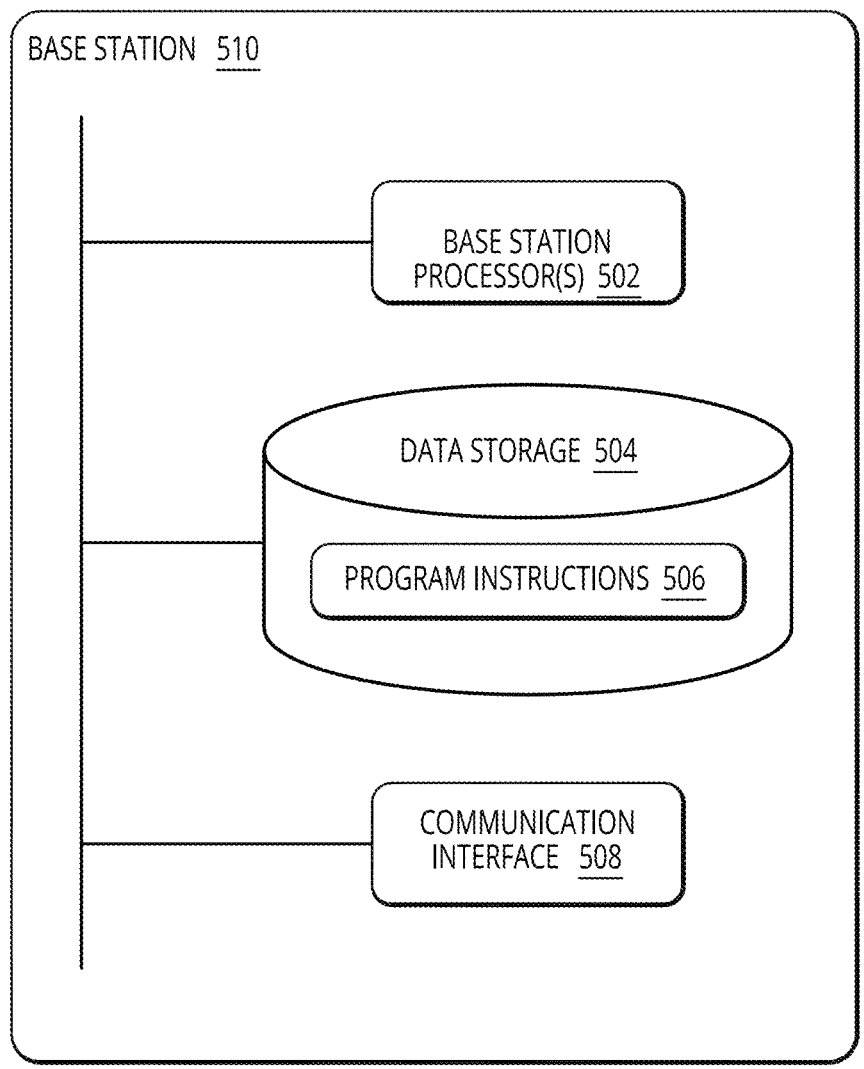
FIG. 6B is a schematic view of a computing system of a base station in accordance with an embodiment of the present technology.

FIG. 6B is a schematic view of a computing system of the base station 510 in accordance with an embodiment of the present technology. In some embodiments, the base station 510 includes one or more processors 502 and data storage 504, such as a non-transitory computer readable medium. The data storage 504 may store program instruction 506, which may be executable by the processor(s) 502. The base station 510 may include a communication interface 508 for communication with the transceiver 410 or directly with the UAV 1000. In different embodiments, the various components of the base station 510 may be arranged and connected in different manners.

Figure 7:
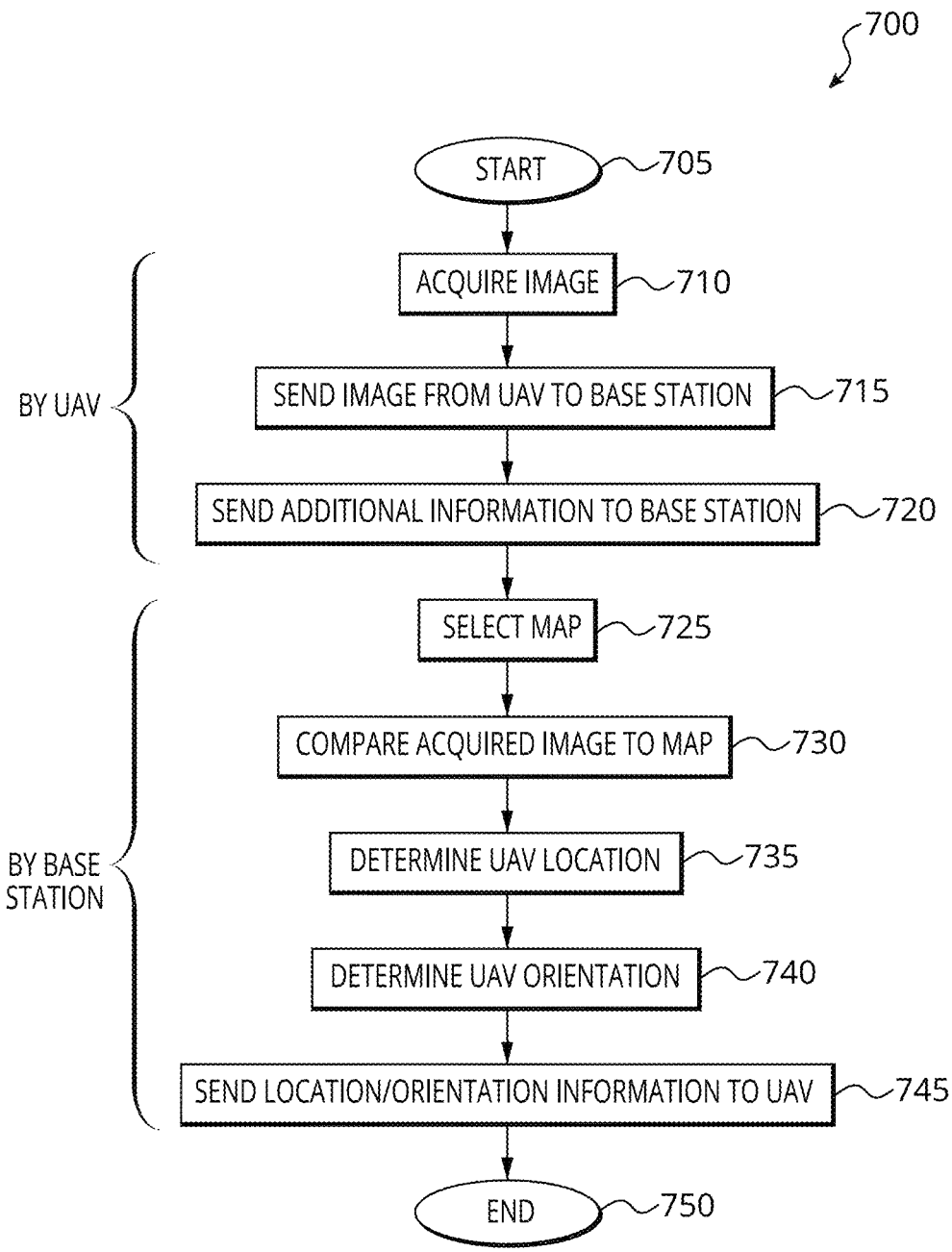
FIG. 7 is a flow diagram of a method for UAV navigation in accordance with an embodiment of the present technology.

FIG. 7 is a flow diagram of a method for UAV navigation in accordance with an embodiment of the present technology. In some embodiments, the method may include additional steps or may be practiced without all steps illustrated in the flow chart. Furthermore, in some embodiments, the order of the steps listed may be changed.

The method starts in block 705, and continues to block 710. In block 710, the UAV 1000 acquires one or more images of the ground area. The camera may have adjustable angle of view such that, for example, a smaller angle of view is used at higher altitude, and a larger angle of view is used at a lower altitude. In some embodiments, the pivot mechanism can control the orientation of the camera with respect to the plane of ground.

In block 715, one or more images are sent to the ground transceiver, and further to the base station for processing. In some embodiments, the UAV also sends image tags (e.g., unique alpha-numerical or other tags) to the base station.

In block 720, the UAV sends additional information to the base station. For example, the intrinsics of the camera (e.g., focal depth, aperture, field of view, etc.,) may be sent to the base station. Other additional information may include rough location of the UAV (e.g., based on GPS data, IMU data, recent known location of the UAV, etc.) when the image was captured, or the time of day when the image was captured.

In block 725, the base station selects a map for finding a match between the image(s) captured by the UAV and segments of the map. In some embodiments, the selection of the map(s) is based on proximity to one or more transceivers 410 that received the images from the UAV. In other embodiments, the maps can be selected based on the time of day (e.g., night or day), weather conditions (e.g., snow, rain, etc.), or other conditions.

In block 730, the base station compares one or more images acquired by the UAV with the segments of the maps (tiles). In different embodiments, different image matching or image recognition techniques may be used by the base station.

In blocks 735 and 740, the base station determines the location and orientation of the camera. In some embodiments, the location/orientation of the camera is determined by matching the pixels of the image to the X, Y, Z coordinates of the characteristic points on the terrestrial map, followed by numerical "line tracing" back to the camera. In some embodiments, the numerical algorithms may be at least partially executed by the computing devices carried by the UAV itself. In some embodiments, computing devices at the base station may be used for rapid determination of the location and orientation of the camera (e.g., within 1 second of receiving the image for the UAV). In some embodiments, the required computer calculations may be done at least in part by the UAV itself.

In block 745, the information about the location and orientation of the UAV is sent back to the UAV. In some embodiments, the location/orientation information is sent to the UAV over the transceiver 410. When the elapsed time between the acquisition of the image and the determination of the location/orientation of the UAV is relatively short, the UAV may determine its present location more precisely based on, for example, known velocity of the UAV. The method ends in block 750. The example in FIG. 7 indicates blocks 725-745 are performed by a base station, but in other examples, one or more blocks 725-745 may be performed by the UAV or other stationary or mobile vehicle or unit. For example, when the base station takes a relatively long time (e.g., 5-10 s) to process the images, the UAV may determine its updated location by tracking the image pixels corresponding to the characteristic points in a sequence of consecutively captured images, as explained with reference to FIG. 5.

Many embodiments of the technology described above may take the form of computer-executable or controller-executable instructions, including routines stored on non-transitory memory and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for navigating an aerial vehicle, comprising:
   flying the aerial vehicle along a flight path;
   acquiring, by a camera carried by the aerial vehicle, an image of a ground area along the flight path;
   generating a timestamp upon acquiring the image;
   sending the image to a base station;
   receiving navigation data for the aerial vehicle from the base station, wherein the navigation data is determined based upon a comparison of the image of the ground area to at least one terrestrial map of the flight path;
   calculating a time lapse between the timestamp and when the navigation data, which includes location data, is received by the aerial vehicle;
   determining a present location of the aerial vehicle based at least in part upon the location data, the time lapse, and a velocity of the aerial vehicle during the time lapse; and
   adjusting a flight course based at least in part upon the navigation data or the present location.

2. The method of claim 1, wherein the aerial vehicle is an unmanned aerial vehicle (UAV).

3. The method of claim 2, further comprising:
   identifying a correspondence between a plurality of pixels of the image and a plurality of characteristic points of the at least one terrestrial map;
   assigning coordinates to the plurality of pixels of the image; and
   determining the navigation data based on the coordinates of the plurality of pixels of the image.

4. The method of claim 2, further comprising:
   navigating the UAV based upon a GPS signal when the GPS signal provides sufficient accuracy for navigation; and
   navigating the UAV based upon the navigation data when the GPS signal does not provide sufficient accuracy for navigation.

5. The method of claim 2, wherein navigating the UAV based upon the navigation data is a backup navigation scheme.

6. The method of claim 2, further comprising:
   the UAV wirelessly communicating with a ground based transceiver, wherein the at least one terrestrial map is selected based upon a location of the ground based transceiver.

7. The method of claim 2, further comprising:
   in conjunction with sending the image to the base station, sending a unique alpha-numerical image tag to the base station;
   receiving the unique alpha-numerical image tag from the base station; and
   based on the unique alpha-numerical image tag, determining a time lapse between sending the image to the base station and receiving the navigation data from the base station.

8. The method of claim 7, wherein the navigation data is a final location data or a final orientation data, the method further comprising: before receiving at least one of the final aerial vehicle location data or the final aerial vehicle orientation data from the base station, receiving an intermediate location data or an intermediate orientation data from the base station.

9. The method of claim 1, wherein the navigation data comprises location data of the UAV.

10. The method of claim 1, wherein the navigation data comprises orientation data of the UAV.

11. The method of claim 1, wherein the camera is carried by a pivot mechanism, the method further comprising:
    determining an orientation of the aerial vehicle based on an orientation of the camera with respect to the aerial vehicle and an orientation of the pivot mechanism with respect to the aerial vehicle.

12. The method of claim 1, wherein the camera is configured to work in a visible spectrum of light during a daytime and in an infrared spectra of light during a nighttime.

13. The method of claim 1, further comprising:
    before sending the image to the base station, analyzing the image and filtering the image by removing a portion of the image deemed related to movable or changeable objects in the image to improve a match between the image and the terrestrial map.

14. The method of claim 13, wherein the navigation data is determined in part by the UAV.

15. A method for determining navigation data for an aerial vehicle, comprising:
    receiving an image at a base station in communication with the aerial vehicle in flight, wherein the image is of a ground area and is captured by the aerial vehicle, wherein the image is communicated to the base station from the aerial vehicle via at least one ground-based transceiver;
    selecting a terrestrial map segment of the ground area based at least in part upon a location of the at least one ground-based transceiver;

comparing the image with the terrestrial map segment of the ground area;
identifying correspondences between the terrestrial map segment and the image;
determining the navigation data for the aerial vehicle based at least in part upon the correspondences; and
transmitting the navigation data to the aerial vehicle.

16. The method of claim 15, further comprising:
detecting a difference between the image and the terrestrial map segment that corresponds to the image; and
updating the terrestrial map segment with the image.

17. The method of claim 15, wherein the aerial vehicle is an unmanned aerial vehicle (UAV).

18. A non-transitory computer-readable medium having computer-executable instructions stored thereon that, in response to execution by one or more processors of a computing device, cause the computing device to perform actions comprising:
receiving an image of a ground area, wherein the image is acquired by a camera carried by an unmanned aerial vehicle (UAV);
comparing the image with a terrestrial map of the ground area;
identifying a section of the terrestrial map that corresponds to the image;
identifying a correspondence between a plurality of pixels of the image and a plurality of characteristic points of the section;
assigning coordinates to the plurality of pixels of the image;
determining navigation data for the UAV based on the coordinates of the plurality of pixels of the image;
transmitting the navigation data to the UAV;
detecting a difference between the image and the section of the terrestrial map that corresponds to the image; and
updating the section of the terrestrial map based on the image.

19. At least one non-transitory computer-readable medium having computer-executable instructions stored thereon that, in response to execution by one or more processors of an aerial vehicle, cause the aerial vehicle to perform actions comprising:
acquiring, by a camera carried by the aerial vehicle, an image of a ground area along a flight path;
before sending the image to a base station, analyzing the image and filtering the image by removing a portion of the image deemed related to movable or changeable objects in the image to improve a match between the image and a terrestrial map section of the flight path;
sending the image to the base station;
receiving navigation data for the aerial vehicle from the base station, wherein the navigation data is determined based upon a comparison of the image of the ground area to the terrestrial map section; and
controlling a flight course of the aerial vehicle based at least in part upon the navigation data.

20. At least one non-transitory computer-readable medium having computer-executable instructions stored thereon that, in response to execution by one or more processors of an aerial vehicle, cause the aerial vehicle to perform actions comprising:
acquiring, by a camera carried by the aerial vehicle, an image of a ground area along a flight path;
generating a timestamp upon acquiring the image;
sending the image to a base station;
receiving navigation data for the aerial vehicle from the base station, wherein the navigation data is determined based upon a comparison of the image of the ground area to at least one terrestrial map of the flight path;
calculating a time lapse between the timestamp and a subsequent time after the navigation data, which includes location data, is received by the aerial vehicle;
determining a present location of the aerial vehicle based at least in part upon the location data, the time lapse, and a velocity of the aerial vehicle during the time lapse; and
controlling a flight course of the aerial vehicle based on at least one of the navigation data or the present location.

* * * * *